United States Patent
Wieland

(10) Patent No.: US 9,033,254 B2
(45) Date of Patent: May 19, 2015

(54) SOLAR HEATED WATER DISTRIBUTION SYSTEM

(75) Inventor: Jeff Wieland, Princeton, TX (US)

(73) Assignee: Jeff A. Wieland

(*) Notice: Subject to any disclaimer, the term of this patent is extended or adjusted under 35 U.S.C. 154(b) by 782 days.

(21) Appl. No.: 13/187,214

(22) Filed: Jul. 20, 2011

(65) Prior Publication Data
US 2013/0019858 A1 Jan. 24, 2013

(51) Int. Cl.
G05D 23/13 (2006.01)
G05D 23/12 (2006.01)
F25B 27/00 (2006.01)
F24J 2/42 (2006.01)
F24J 2/26 (2006.01)
F24J 2/04 (2006.01)
F24D 17/00 (2006.01)
F24D 19/10 (2006.01)

(52) U.S. Cl.
CPC ........ F24D 17/0021 (2013.01); F24D 19/1057 (2013.01); Y02B 10/20 (2013.01)

(58) Field of Classification Search
CPC .................................................. F24D 17/0021
USPC .......... 62/235.1, 236; 236/12.1, 12.13, 12.14, 236/12.23; 126/615, 641, 585, 587
See application file for complete search history.

(56) References Cited

U.S. PATENT DOCUMENTS

| | | | | | |
|---|---|---|---|---|---|
| 1,889,238 | A | * | 11/1932 | Clark | 126/639 |
| 3,989,032 | A | * | 11/1976 | Harrison | 126/585 |
| 4,052,001 | A | * | 10/1977 | Vogt | 126/585 |
| 4,119,087 | A | * | 10/1978 | Cook | 126/588 |
| 4,155,506 | A | * | 5/1979 | Brosenius | 237/81 |
| 4,159,017 | A | * | 6/1979 | Novi | 126/611 |
| 4,479,487 | A | * | 10/1984 | Migdal | 126/588 |
| 4,604,991 | A | * | 8/1986 | Miller | 126/619 |
| 4,644,935 | A | | 2/1987 | Gallagher | |
| 6,763,826 | B1 | | 7/2004 | Gumm | |
| 7,277,627 | B2 | | 10/2007 | Hughes | |
| 7,549,418 | B1 | | 6/2009 | Moorman | |

FOREIGN PATENT DOCUMENTS

EP 2192467 A1 * 6/2010
JP 2005226924 A * 8/2005

OTHER PUBLICATIONS

Machine translation of Foreign Document JP2005226924A, titled JP2005226924.*
European Publication EP2192467A1, titled EP2192467.*

* cited by examiner

Primary Examiner — M. Alexandra Elve
Assistant Examiner — Paul Alvare

(57) ABSTRACT

A non electric, temperature controlled system for passing or bypassing a solar water heating apparatus includes a temperature controlled water distribution valve directing water to flow from a main supply of water toward a user depending on the setting and configuration of the temperature controlled water distribution valve within the system.

1 Claim, 10 Drawing Sheets

Figure 10

| Input/Temp. | STATE # | #3 | #4 | #14 | #15 | #16 TEMP. | #20 | #19 | Supply TEMP. |
|---|---|---|---|---|---|---|---|---|---|
| 35 | 1 | ON | OFF | ON | ON | 115 | OFF | ON | 115 |
| 40 | 1 | ON | OFF | ON | ON | 115 | OFF | ON | 115 |
| 50 | 1 | ON | OFF | ON | ON | 115 | OFF | ON | 115 |
| 60 | 1 | ON | OFF | ON | ON | 115 | OFF | ON | 115 |
| 65 | 1 | ON | OFF | ON | ON | 115 | OFF | ON | 115 |
| 70 | 1 | ON | ON | ON | ON | 115 | OFF | ON | 115 |
| 75 | 2 | OFF | ON | ON | ON | 115 | OFF | ON | 115 |
| 80 | 2 | OFF | ON | ON | ON | 115 | OFF | ON | 115 |
| 90 | 2 | OFF | ON | ON | ON | 115 | OFF | ON | 115 |
| 100 | 2 | OFF | ON | ON | ON | 115 | OFF | ON | 115 |
| 110 | 2 | OFF | ON | ON | ON | 115 | OFF | ON | 115 |
| 115 | 2 | OFF | ON | ON | ON | 115 | OFF | ON | 115 |
| 120 | 3 | OFF | ON | OFF | ON | 120 | OFF | ON | 120 |
| 125 | 3 | OFF | ON | OFF | ON | 125 | ON | ON | 125 |
| 130 | 4 | OFF | ON | OFF | No flow | No flow | ON | OFF | 130 |
| 140 | 4 | OFF | ON | OFF | No flow | No flow | ON | OFF | 140 |
| 160 | 4 | OFF | ON | OFF | No flow | No flow | ON | OFF | 160 |
| 180 | 4 | OFF | ON | OFF | No flow | No flow | ON | OFF | 180 |
| 200 | 4 | OFF | ON | OFF | No flow | No flow | ON | OFF | 200 |
| Input/Temp. | STATE # | #3 | #4 | #14 | #15 | #16 TEMP. | #19 | #20 | Supply TEMP. |

SOLAR HEATED WATER DISTRIBUTION SYSTEM

FIELD

The disclosed invention relates to an automatic system and method for distribution of solar heated water or similarly heated water to users, in an efficient and simple method without the use of electricity.

BACKGROUND

Typically, utility company water is provided to users via an underground pipe causing geothermal energy transfer. As water enter into a (GEWH) Gas or Electric Water Heater, in a home or business, the GEWH must increase the water temperature for house or building use. Geothermal energy affects water temperature and causes water to have a temperature, which is based both on earth temperature and water pipe temperature. For example, a 100° F. day may yield water at 70° F. for delivery to the inlet of a GEWH.

Several solar devices for using solar energy to heat water exist to increase water temperature prior to entering GEWH. As a solution various solar heat transfer devices have been placed in or around attics, rooftops and heat sources using various configurations to transfer heat from the solar device to water. These devices can run out of hot water at night or on a cooler day, these devices supply cooler water to the GEWH than utility company water, thus causing the GEWH to consume more energy to heat the cooler water.

One common problem with solar water heating devices is, at times, they provide water into a GEWH at temperatures below the normal utility water feed temperature thereby causing cooler water to enter the GEWH, thus causing more energy use. For instance on a day when the temperature high reaches 80° F., a solar collector may reach over 140° F. and the solar collector works fine. But, by early morning, the ambient temperature may be 55° F. and the solar collector has now become a cooling system. For instance as morning showers are taken, a solar heat transfer device can remove heat from the utility water feed causing cooler water to be distributed into the GEWH (colder than the utility water feed temperature).

A solar water heating system may provide water at 120° F. into a GEWH; this 120° F. water is typically cooler than the heater thermostat setting, thus causing GEWH energy use.

Although a solar heat transfer device could incorporate seasonally adjustable, user operated manual valves, or electronic actuated solenoids based on temperature sensing, the solenoids and controlling electronics are expensive, consume electricity to operate and are susceptible to power outages and various reliability issues or are not always automatic and, if not, require electricity for actuation. There is therefore a need for an automatic, low energy consumption system and method for use with a solar powered water heating system and a GEWH to minimize the energy consumed to heat the water supplied users.

RELATED ART

Although, no device is currently specifically designed to meet the needs described in aforementioned Field of the Invention, U.S. Pat. No. 7,240,850 to Beck and U.S. Pat. No. 5,427,312 to Simonov "Thermostatic controlled mixing valves" provide a means for understanding usage and implementation to achieve the needs described above. The related art refer to a device used to limit the temperature of water to an outlet preventing water from becoming to hot. These devices have two inlets designated as hot and cold an outlet and an adjustable thermostat to set desired outlet water temperature. As hot water flows and reaches thermostat setting, the cold water inlet will begin to flow and the hot inlet flow begins reducing so that the temperature remains at or below thermostatic setting.

OTHER RELATED ART CITATIONS

| U.S. patent Documents | | |
|---|---|---|
| 7,549,418 | Jun. 23, 2009 | Moorman |
| Method and device for capture, storage and recirculation of heat energy | | |
| 7,277,627 | Oct. 2, 2007 | Hughes |
| Rooftop water heater | | |
| 6,763,826 | Jul. 20, 2004 | Gumm |
| Solar water heater | | |
| 4,644,935 | Feb. 24, 1987 | Gallagher |
| Solar heater control | | |

SUMMARY

This invention provides major advantages for heated water distribution.

It is an object of the present invention to provide a means to automatically distribute the warmer of either the solar heat generation and/or collection apparatus for water or the utility water feed toward that of a GEWH and/or directly to the hot water pipe of a building.

Another object of this invention is to provide a means to automatically bypass water circulating inside a closed loop (active system) preventing flow through a SWHD when the SWHD is to cool to provide a heating benefit.

Another object of this invention is to provide an efficient and simple method to distribute water from a solar heat generation and/or collection apparatus for water, directly to the hot water supply pipe of house or building, bypassing the GEWH thus keeping the existing GEWH from receiving water that will cause additional energy use.

Another object of this invention is to reduce or at times, eliminate gas or electric consumption of GEWH by efficiently routing water without the use of electric controlled valves or user participation.

DESCRIPTION OF DRAWING FIGURES

FIG. 10 is a state table showing valve operation states, showing four states of the open loop system of FIG. 3.

DESCRIPTION OF EMBODIMENTS

Definitions

"Utility water feed" herein refers to any type of water supply under pressure such as from a circulation pump, well pump, utility pipe feed or similar.

"Temperature controlled water-distribution valve" (AKA Temperature Controlled Mixing Valve or Thermostatic Mixing Valve) is a device developed to prevent water flow from becoming to hot by mixing a cold supply of water with a hot supply to limit the maximum temperature to the output.

A "Temperature controlled water-distribution valve" herein is the same device as a Thermostatic Mixing Valve but rather than using as designed to mix cold water with hot water to provide a temperature limit to the output, it is not connected or used according to manufacturer intention, but is used, specifically to control water flow routing from an inlet to outlet based on temperature.

"Connected" and "connections" herein refer to pipe connections.

"GEWH" herein refers to any Gas or Electric Water Heater device.

"Degrees" herein refer to degrees Fahrenheit.

"SWHC" or "Solar heat generation and/or heat collection apparatus for water", herein refers to a solar heat collection device or other "renewable energy" heat collection device that transfers heat to water.

"Activation Temperature" herein refers to water flow either starting or stopping.

"Cooling Down Effect" herein refers to when water flowing through a SWHC exits the SWHC cooler than when it went in the SWHC.

"Threshold Mode" herein refers to a bypass condition when water flow is bypassed from entering the SWHC to prevent a cooling down effect.

"Normal Mode" herein refers to a condition when water flow is through the SWHC causing water to become heated.

"Open Loop System" AKA "passive solar water heating system" herein refers to commonly used term referring to a configuration for Solar Fluid Heating having a passive means without the use of circulating fluid pump.

"Closed Loop System" herein refers to commonly used term referring to a configuration for Solar Fluid Heating having a means of circulating pump and heat exchange method.

Figure 4:
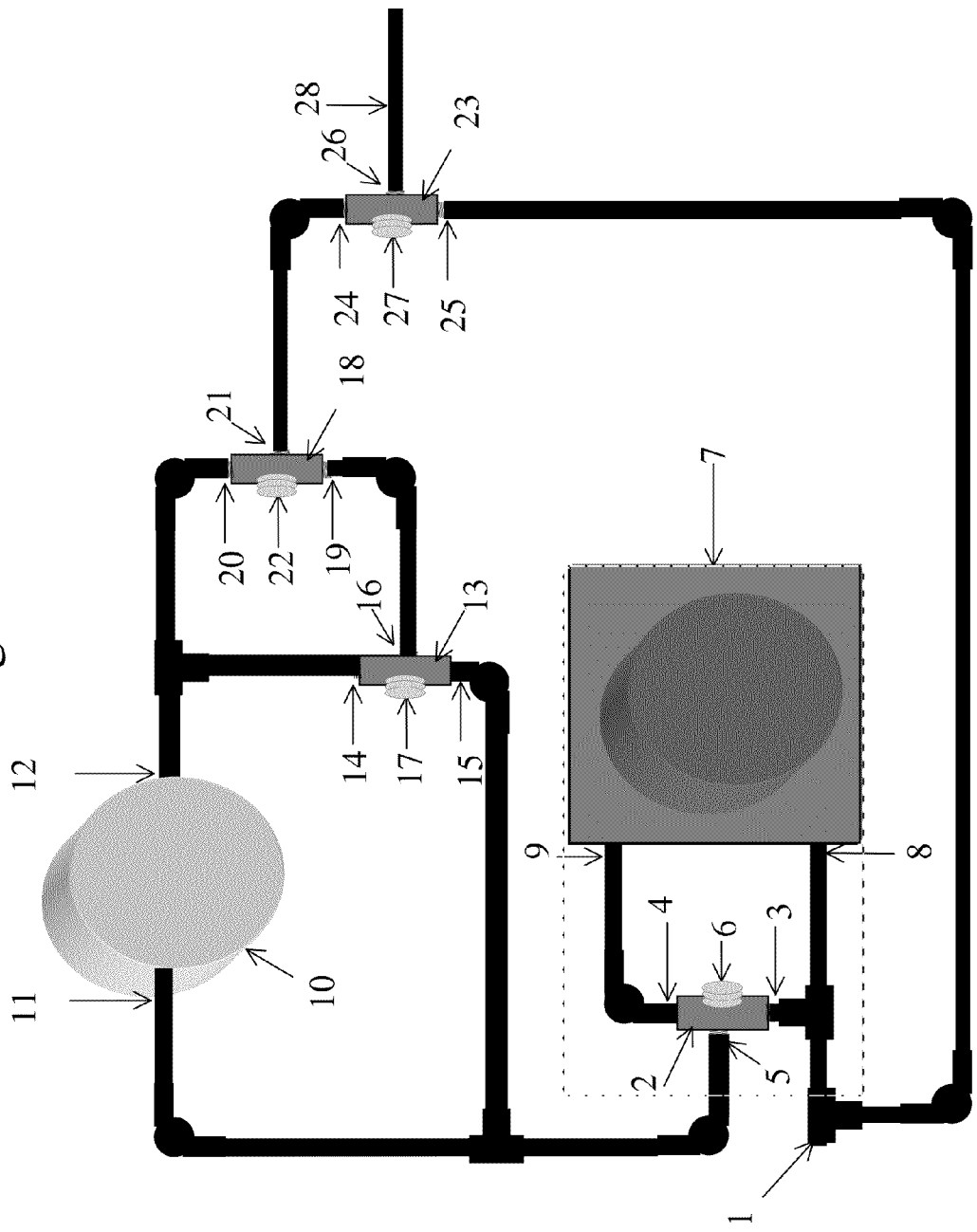
FIG. 4 is an illustration of an embodiment implementing a First temperature controlled water-distribution valve, a second temperature controlled water-distribution valve, and third temperature controlled water-distribution valve, and with a Mixing Valve to prevent extremely hot water from entering the building.

Referring to FIG. 4 of the drawings, please locate the following: utility water feed 1, First temperature controlled water-distribution valve 2, having hot inlet 3, cold inlet 4, outlet 5, and temperature adjustment 6; SWHC 7, having inlet 8 and outlet 9; GEWH with or without a tank heat storage means 10 including an inlet pipe 11, an outlet pipe 12, second temperature controlled water distribution valve 13, having hot inlet 14, cold inlet 15, outlet 16, and temperature adjustment 17.

Inlet feed 1 connected to both hot inlets 3 and inlet 8. Outlet 9 is connected to cold inlet 4. Outlet 5 is connected to both inlet 11 and cold inlet 15. Outlet 12 is connected to hot inlet 14.

Third temperature controlled water distribution valve 18, having hot inlet 19, cold inlet 20, outlet 21, and temperature adjustment 22.

Fourth temperature controlled water-distribution valve 23 used in the traditional configuration, having hot inlet 24, cold inlet 25, outlet 26, and temperature adjustment 27, and hot fluid outlet pipe 28.

First temperature controlled water-distribution valve 2 description.

Having made the above connections using appropriate pipe means, the First temperature controlled water-distribution valve 2 must be located within a SWHC or similar casing that will mimic the temperature of the SWHC being controlled. Temperature adjustment 6, of first temperature controlled water-distribution valve, must be set for a desired activation temperature based on nominal summertime ground water temperature, (typically 70 degrees). GEWH temperature setting is at 130 degrees F.

Figure 1:
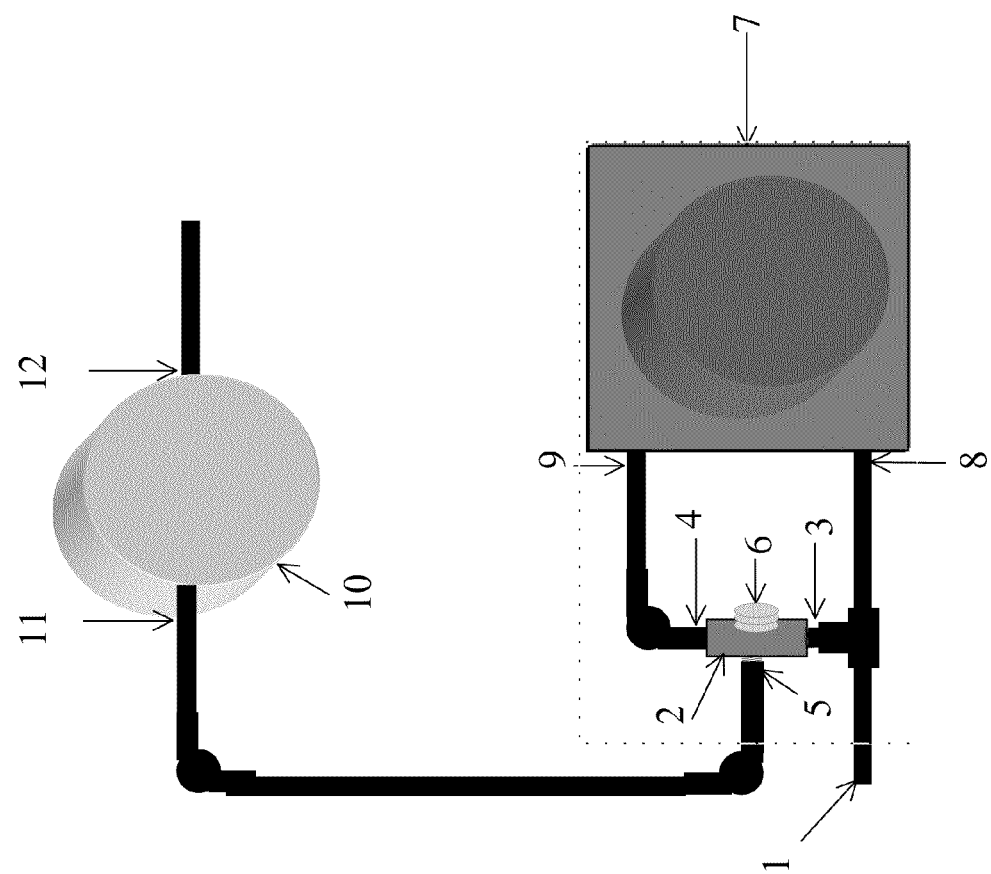
FIG. 1 is an illustration of an embodiment implementing a first temperature controlled water-distribution valve 2 without a second temperature controlled water-distribution valve.

Referring to FIG. 1, as the first temperature controlled water distribution valve 2 reaches the desired activation temperature, and hot water is consumed, water flow will reduce on hot inlet 3 and increase on cold inlet 4, thus distributing the warmer water from the SWHC 7. As long as water from the SWHC provides water warmer than the desired activation temperature, water will be distributed via cold inlet accordingly. If water from the SWHC 7 provides water cooler than the desired activation temperature, water will be distributed via hot inlet 3 taking water directly from warmer utility water feed 1.

For example, on a warmer night if outlet 9 provides water above 80° F., then water will flow from inlet 4, to outlet 5, thus providing warmer water from SWHC 7, until such a time when the temperature is below the desired activation temperature.

On a cooler night if outlet 9 provides water near 65° F. or less, then water will flow from inlet 3, to outlet 5, thus providing warmer water from utility water feed 1.

Figure 2:
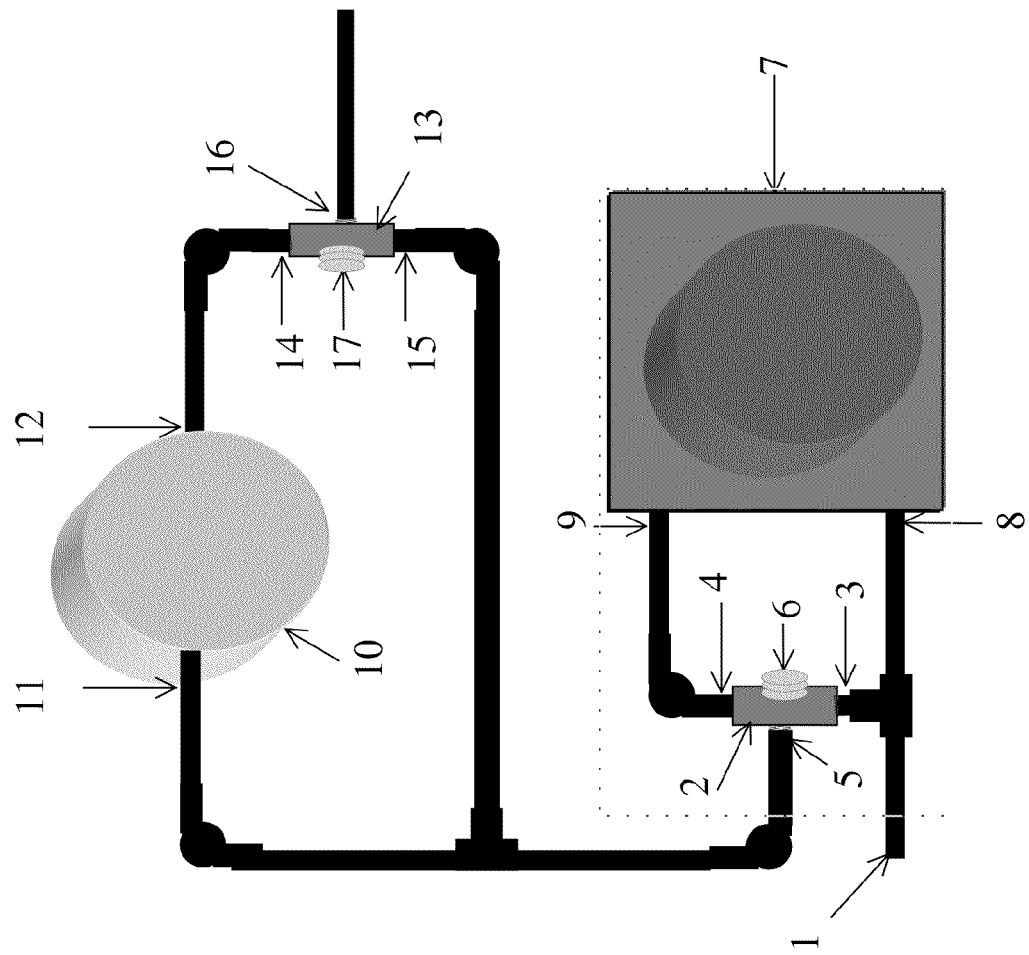
FIG. 2 is an illustration of an embodiment implementing a first temperature controlled water-distribution valve 2 with a second temperature controlled water-distribution valve.

Referring to FIG. 2, the Second temperature controlled water distribution valve is used to bypass the GEWH when water from the SWHC is above desired activation temperature (typically 115 degrees).

The temperature adjustment 17, of second temperature controlled water distribution valve 13, must be set for a desired activation temperature based on desired minimum hot water supply temperature (typically set 115° F.) to house or building. Upon water flow from either of inlets 14, or 15, to outlet 16, having a temperature above activation temperature, will cause water flow to become reduced and/or stopped, on inlet 14 and increased on inlet 15, thus reducing or stopping water flow (depending on inlet 15 temperature) thus reducing or stopping consumption of water from the GEWH, thus reducing or stopping energy consumption associated with heating newly introduced water into 10.

Water flow from inlet 15, to outlet 16 having a temperature below desired minimum hot water supply temperature causes water flow to become reduced on inlet 15 and increased on inlet 14, thus maintaining desired minimum hot water supply temperature to outlet 16.

Figure 3:
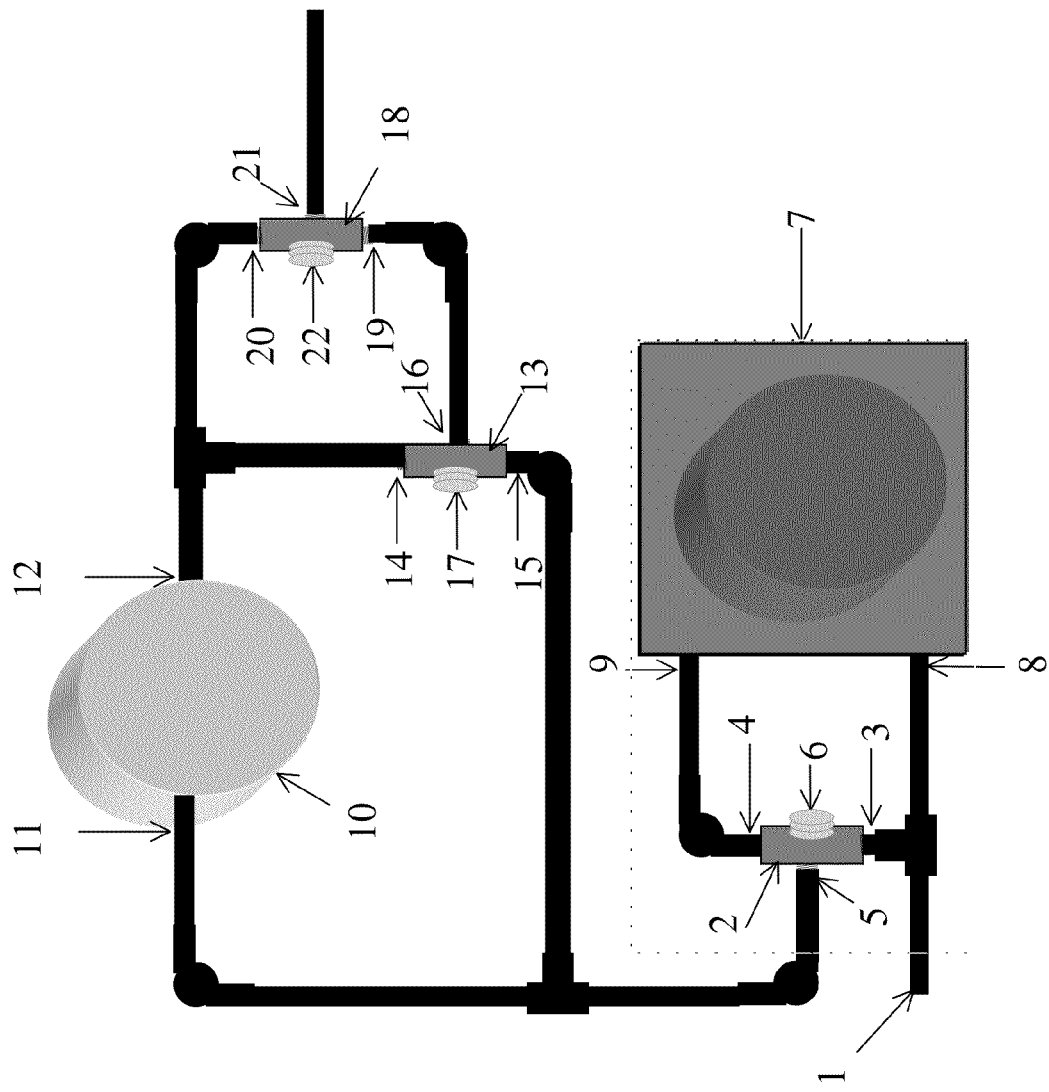
FIG. 3 is an illustration of an embodiment implementing a First temperature controlled water-distribution valve; a second temperature controlled water-distribution valve, and third temperature controlled water-distribution valve.

Referring to FIG. 3, the Third temperature controlled water distribution valve 18 provides water distribution to be via the GEWH when the desired activation temperature is reached. The third valve serves to prevent water over a certain temperature (typically approx 130° F. or that of just over the GEWH) from bypassing the water heater and will cause water to again flow through GEWH once a temperature over 130° F. is reached, thus allowing the hot flow via GEWH to aid in storage of hot water. The temperature adjustment 22, of third temperature controlled water-distribution valve 18, must be set for a desired activation temperature based on thermostat temperature setting of GEWH (typically 130° F.). Upon water flow from either of inlets 20, or 19, to outlet 21, having a temperature above the desired activation temperature, will cause water flow to become reduced and/or stopped, on inlet 19 and increased on inlet 20, thus reducing or stopping water from outlet 16 thus causing water flow through the GEWH, thus reducing or stopping energy consumption associated with heating newly introduced cooler water into 10, and putting water hotter into the GEWH than it's thermostat is set for and effectively using the GEWH as a hot water storage device without the use of energy.

Referring to FIG. 4, the Fourth temperature controlled water-distribution valve 23 operation description: The fourth valve is connected and used in the traditional manner of a thermostatic mixing valve and serves to limit the maximum temperature of water delivered to the house or building.

Temperature adjustment 27, of fourth temperature controlled water-distribution valve 23, must be set for a desired activation temperature based on maximum temperature desired of the house or building (typically 130° F.). Upon water flow from inlet 25, to outlet 26, having a temperature above the desired minimum hot water supply temperature, will cause water flow to become reduced and/or stopped, on inlet 25 and increased on inlet 24, thus reducing temperature to pipe 28.

Figure 5:
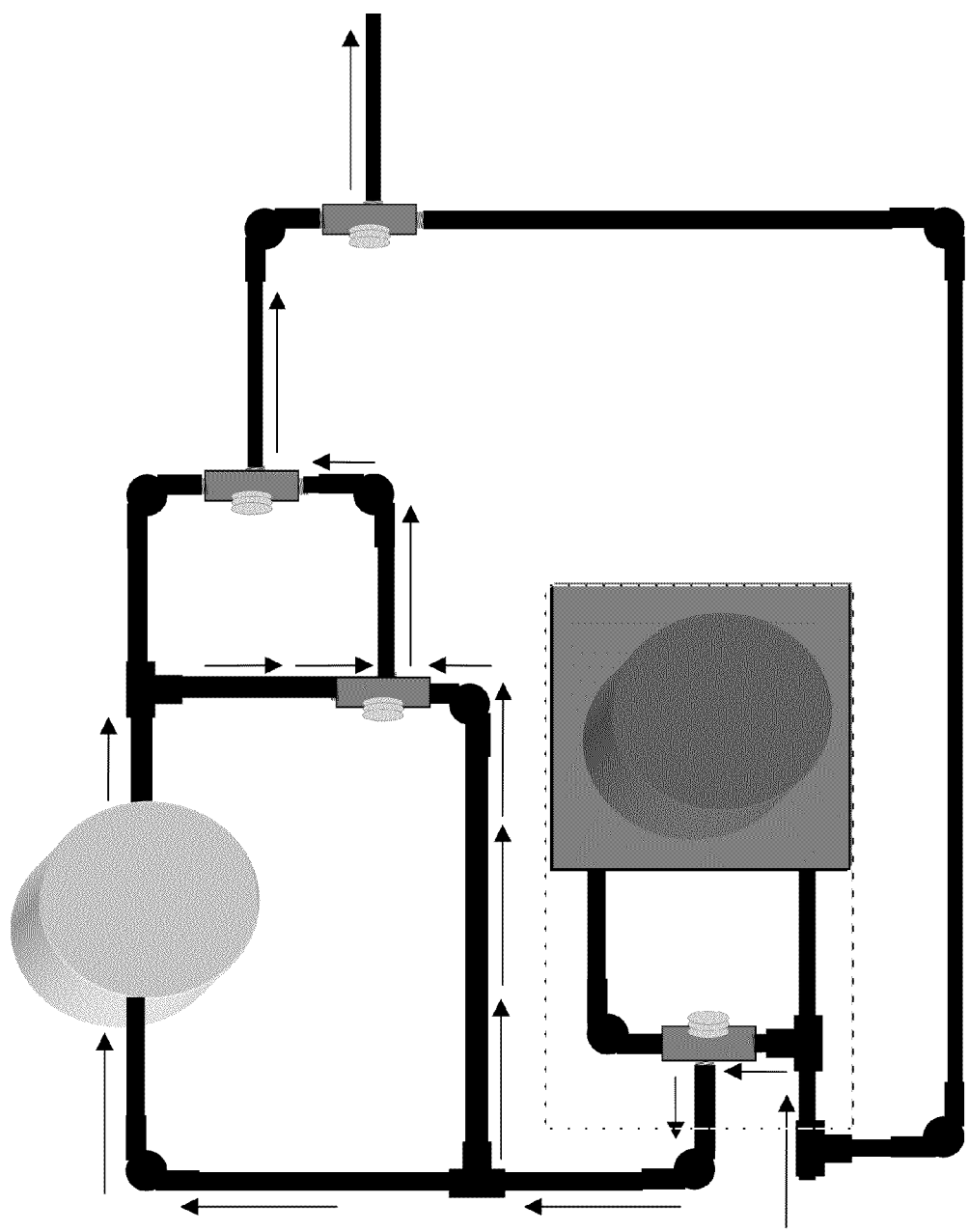
FIG. 5 is an illustration of preferred embodiment general water flow direction at cooler temperatures. (State1=typically below 70 degrees)

FIG. 5 shows the water flow with first temperature controlled water-distribution valve 2 in "threshold mode" when water temperature of the SWHC temperature is lower than set activation temperature of the first temperature controlled water-distribution valve. It is in a bypass mode so water doesn't flow through the SWHC and produce the cooling down effect.

Figure 6:
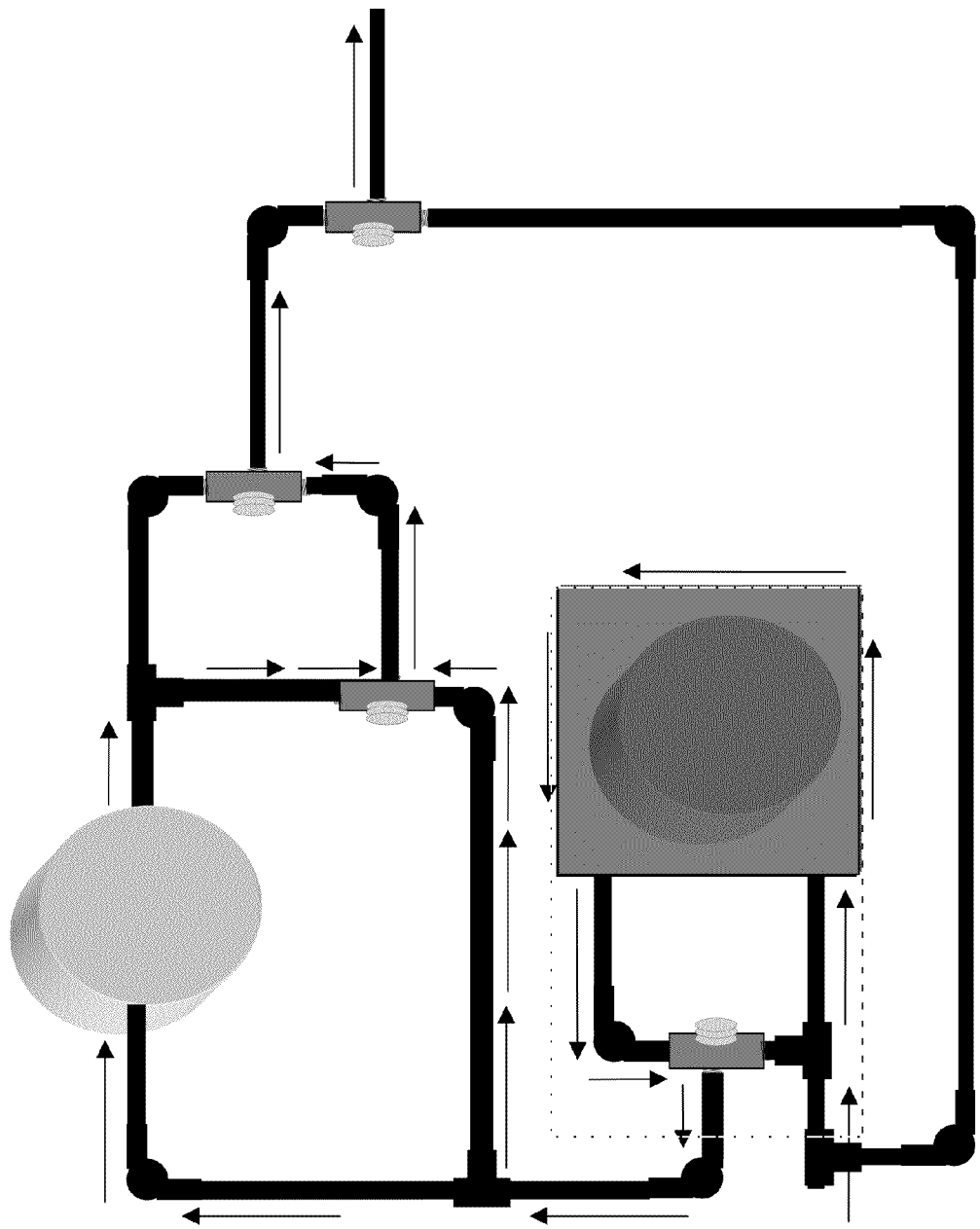
FIG. 6 is an illustration of a preferred embodiment general water flow direction at warmer temperatures (State2=typically between 70 and 115 degrees)

FIG. 6 shows the water flow with first temperature controlled water distribution valve 2 in "normal mode" when water temperature of the SWHC temperature is higher than set activation temperature of the first temperature controlled water-distribution valve. And shows water flow when water temperature from SWHC is below 115 degrees. Water flow through the second temperature controlled water-distribution valve is mixing from both inlets to provide an outlet temperature of 115 degrees.

Figure 7:
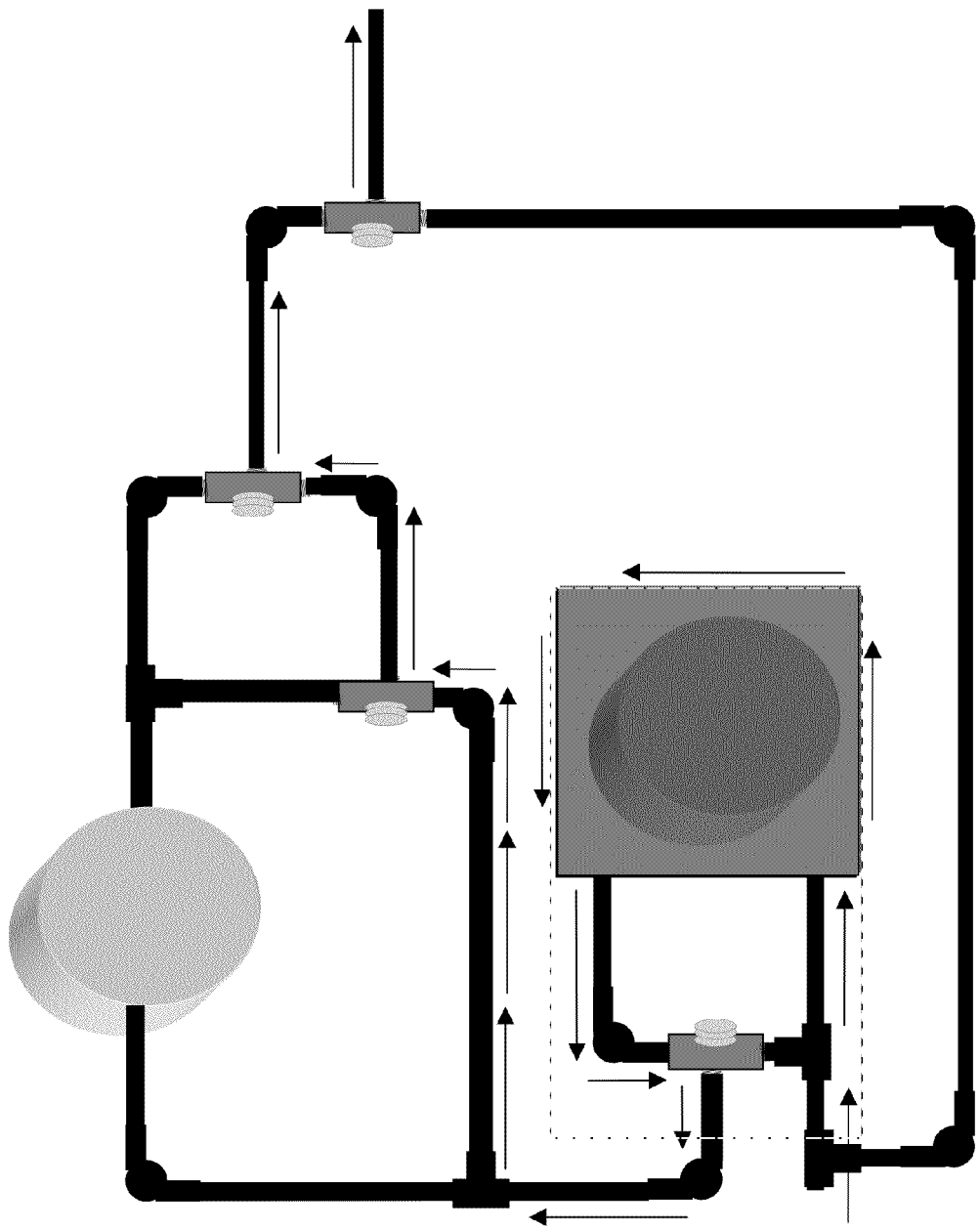
FIG. 7 is an illustration of a preferred embodiment general water flow direction at warmer temperatures (State3=typically between 115 and 125 degrees)

FIG. 7 shows the water flow with Second temperature controlled water distribution valve as it reaches and exceeds the activation temperature, bypassing the GEWH.

Figure 8:
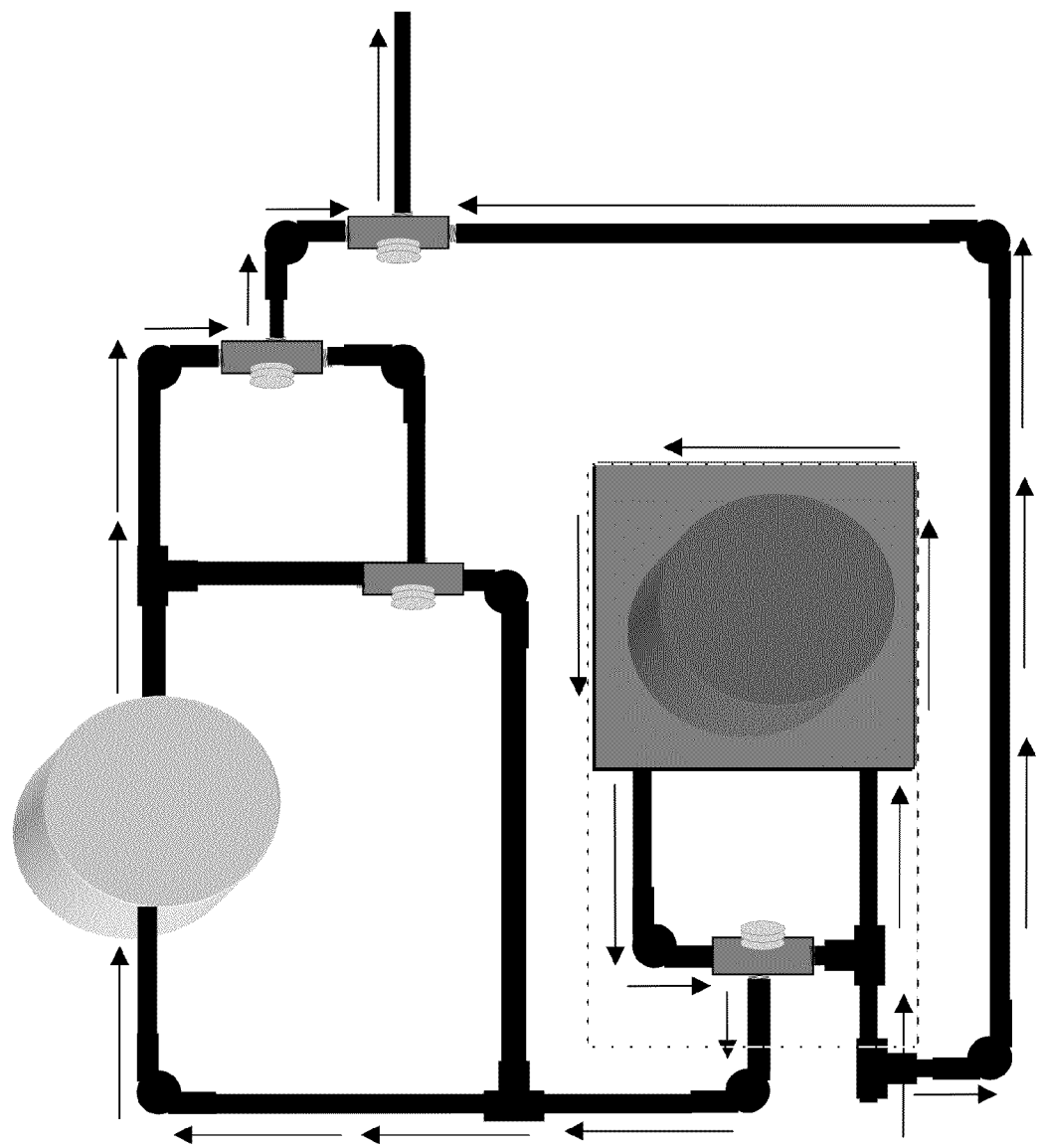
FIG. 8 is an illustration of a preferred embodiment general water flow direction at hotter temperatures (State4=typically 125° F. and hotter)

FIG. 8 shows water flow when water temperature from the SWHC has exceeded that of the GEWH and the water flow through the second temperature controlled water-distribution valve 13 is no longer possible because the third temperature controlled water-distribution valve 18 has reached or exceeded the activation temperature (typically 130 degrees or equal to the GEWH temperature) and reduced or stopped the output. Water flow from the SWHC is now routing totally through the GEWH allowing extra hot water to be stored within the GEWH. Also shown is a fourth temperature controlled water distribution valve 23 used in the traditional manner to limit water to a desired maximum temperature to prevent scalding of users.

Figure 9:
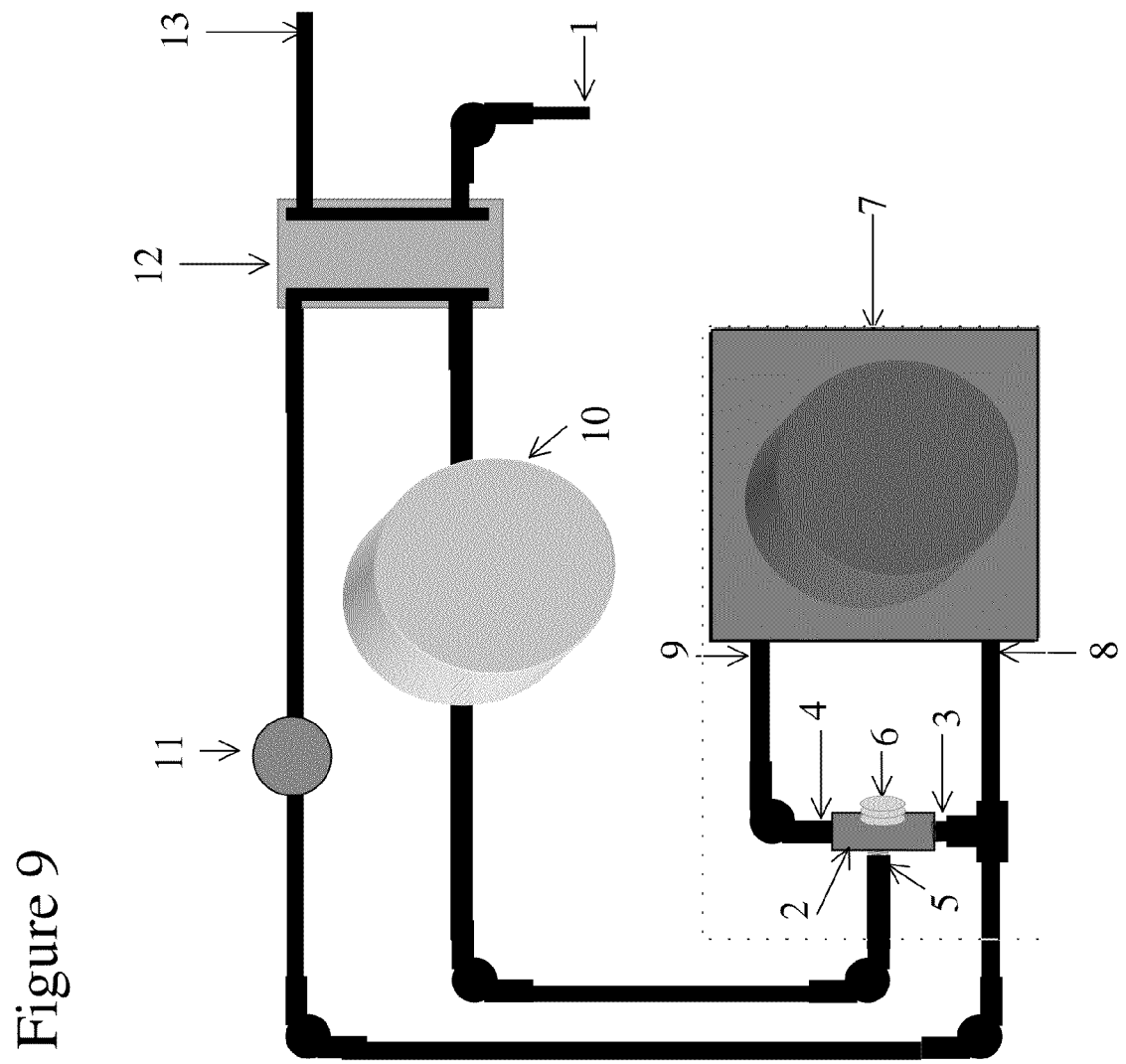
FIG. 9 is an illustration of a preferred embodiment within a closed loop circulation system.

FIG. 9 Shows a "closed loop" SWHC having first temperature controlled water-distribution valve 2 consisting of the following: utility water feed 1, temperature controlled water distribution valve 2, having hot inlet 3, cold inlet 4, outlet 5, and temperature adjustment 6; SWHC 7, having inlet 8 and outlet 9; GEWH 10, Fluid circulation pump 11, heat-exchanger 12, Outlet Pipe 13.

Having made the above connections using appropriate pipe means, temperature adjustment 6, of FIG. 9 should be set equal to, or slightly above that of the water temperature flowing into inlet 8 or inlet 3. As the SWHC warms up, the first temperature controlled water distribution valve 2 reaches the desired activation temperature (typically between 110 and 130 degrees), water flow will reduce on hot inlet 3 and increase on cold inlet 4, thus distributing the warmer water from the SWHC 7. As long as water from the SWHC provides water warmer than the desired activation temperature, water will be distributed via inlet 4 accordingly. If water from the SWHC 7 provides water cooler than the desired activation temperature, water will bypass the SWHC 7 circulating via hot inlet 3.

FIG. 10 shows various states of an open loop system at a range of temperatures that might be expected. State # indicates a state change occurrence of one or more input or outputs of one or more Temperature controlled water-distribution valves.

As will be understood by a person of ordinary skill in the art anyone of the foregoing disclosed temperature controlled water-distribution valves may stand on their own.

What is claimed is:

1. A water flow system configuration comprising:
    a first temperature controlled water distribution valve, having a hot water inlet, a cold water inlet, and an outlet connected according to the following arrangement;
    said hot water inlet of said first temperature controlled water distribution valve, a main supply of water, and an inlet port to a solar water heating apparatus all sharing a common junction;
    said cold water inlet of said first temperature controlled water distribution valve, and an outlet port to a solar water heating apparatus sharing a common junction;
    wherein said first temperature controlled water distribution valve is configured to provide a water flow path from the main supply of water to a user bypassing the water heating apparatus if the temperature setting of said first temperature controlled water distribution valve is below a predetermined setting;
    a second temperature controlled water distribution valve, having a hot water inlet, a cold water inlet, and an outlet connected according to the following arrangement;
    said cold inlet of said second temperature controlled water distribution valve, inlet of a Gas or Electric Water Heater apparatus and outlet of the first temperature controlled water distribution valve all sharing a common junction;
    said hot inlet of said second temperature controlled water distribution valve, outlet of a gas or electric water heating apparatus and cold inlet of a third temperature controlled water distribution valve all sharing a common junction;
    wherein said second temperature controlled water distribution valve is configured to provide a water flow path for bypassing the gas or electric water heating apparatus if the temperature is above a predetermined setting, allowing water to bypass the gas or electric water heater;
    said third temperature controlled water distribution valve, having a hot water inlet, a cold water inlet and an outlet connected according to the following arrangement;

said hot water inlet of said third temperature controlled water distribution valve and outlet of the second temperature controlled water distribution valve sharing a common junction;

said outlet of said third temperature controlled water distribution valve and hot inlet of a fourth temperature controlled water distribution valve sharing a common junction;

wherein said third temperature controlled water distribution valve is configured to prevent the flow of water through the second temperature controlled water distribution valve if a temperature of the water exceeds a predetermined temperature causing water to pass through the gas or electric water heating apparatus after a predetermined temperature is reached, thereby allowing the flow of hot water through the gas or electric water heater to aid in the storage of hot water;

said fourth temperature controlled water distribution valve, having a hot water inlet, a cold water inlet, and an outlet connected according to the following arrangement; said cold water inlet and said main supply of water sharing a common junction;

said outlet of said fourth temperature controlled water distribution valve and piping toward end users share a common junction;

wherein said fourth temperature controlled water distribution valve is configured to operate as a typical mixing valve keeping water exiting from said outlet of the fourth temperature controlled water distribution valve from exceeding a predetermined temperature.

* * * * *